(12) United States Patent
Marinier et al.

(10) Patent No.: US 9,918,260 B2
(45) Date of Patent: *Mar. 13, 2018

(54) METHOD AND APPARATUS OF RESOLVING PCI CONFUSION FOR PROVIDING INBOUND MOBILITY TO CLOSED SUBSCRIBER GROUP

(71) Applicant: InterDigital Patent Holdings, Inc., Wilmington, DE (US)

(72) Inventors: Paul Marinier, Brossard (CA); Diana Pani, Montreal (CA); Shankar Somasundaram, Sunnyvale, CA (US); Ulises Olvera-Hernandez, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/262,364

(22) Filed: Sep. 12, 2016

(65) Prior Publication Data

US 2016/0381608 A1    Dec. 29, 2016

Related U.S. Application Data

(63) Continuation of application No. 12/759,908, filed on Apr. 14, 2010, now Pat. No. 9,445,318.

(Continued)

(51) Int. Cl.
*H04W 4/00* (2009.01)
*H04W 36/00* (2009.01)
(Continued)

(52) U.S. Cl.
CPC ... *H04W 36/0083* (2013.01); *H04W 36/0061* (2013.01); *H04W 84/045* (2013.01); *H04W 88/02* (2013.01); *H04W 88/08* (2013.01)

(58) Field of Classification Search
CPC ... H04W 4/00; H04W 36/00; H04W 36/0061; H04W 36/0083; H04W 84/04; H04W 84/045

See application file for complete search history.

(56) References Cited

U.S. PATENT DOCUMENTS 5,995,836 A   11/1999  Wijk et al.
6,754,493 B1   6/2004  Jetzek
(Continued)

FOREIGN PATENT DOCUMENTS

CN   101291249    10/2008
JP   2001-061177   3/2001
(Continued)

OTHER PUBLICATIONS

Ericsson, "Support for hybrid home base stations," 3GPP TSG RAN2 #65bis, R2-092083 (Mar. 2009).

(Continued)

*Primary Examiner* — Blane Jackson
(74) *Attorney, Agent, or Firm* — Volpe and Koenig, P.C.

(57) ABSTRACT

Method and apparatus for providing inbound mobility to closed subscriber group (CSG) and hybrid cells are described. A wireless communication device includes a receiver configured to receive, from a wireless transmit/receive unit (WTRU), information indicating that a physical cell identity (PCI) of a neighbor closed subscriber group (CSG) cell corresponds to a predefined CSG cell range, and a transmitter configured to transmit, to the WTRU in response to receiving the information indicating that the PCI of the neighbor CSG cell corresponds to the predefined CSG cell range, an indication to report system information of the neighbor CSG cell. In response to receiving the system (Continued)

information of the neighbor CSG cell, the wireless communication device may initiate a handover of the WTRU to the neighbor CSG cell.

22 Claims, 12 Drawing Sheets

Related U.S. Application Data

(60) Provisional application No. 61/255,251, filed on Oct. 27, 2009, provisional application No. 61/220,226, filed on Jun. 25, 2009, provisional application No. 61/218,820, filed on Jun. 19, 2009, provisional application No. 61/185,793, filed on Jun. 10, 2009, provisional application No. 61/169,190, filed on Apr. 14, 2009.

(51) Int. Cl.
*H04W 84/04* (2009.01)
*H04W 88/08* (2009.01)
*H04W 88/02* (2009.01)

(56) References Cited

U.S. PATENT DOCUMENTS

| | | | |
|---|---|---|---|
| 9,338,719 B2 | 5/2016 | Iwamura | |
| 2009/0239533 A1 | 9/2009 | Somasundaram et al. | |
| 2009/0305699 A1 | 12/2009 | Deshpande et al. | |
| 2010/0029274 A1 | 2/2010 | Deshpande et al. | |
| 2010/0113020 A1 | 5/2010 | Subramanian et al. | |

FOREIGN PATENT DOCUMENTS

| | | |
|---|---|---|
| WO | 08/112161 | 9/2008 |
| WO | 09/022971 | 2/2009 |

OTHER PUBLICATIONS

Interdigital, "Validity of the previously acquired SI for CSG inbound mobility," 3GPP TSG-RAN WG2 Meeting #68; R2-096806 (Nov. 9-13, 2009).
Motorola, "[65b-3]: Inbound CSG Mobility-Email Discussion Summary", Agenda Item 4.2.1, 3GPP TSG-RAN WG2, Meeting #66; R2-093135, San Francisco, USA, (May 4-8, 2009).
Motorola, "[66#9] LTE-UMTS: Inbound Mobility to CSG Cell From LTE Cell", Agenda Item 4.2.1.1, 3GPP TSG-RAN WG2, Meeting #66bis; R2-093920, Los Angeles, USA, (Jun. 29-Jul. 3, 2009).
Motorola, "Validity of Acquired System Information for Inbound mobility," 3GPP TSG-RAN WG2#68, R2-096876 (Nov. 2009).
Nokia Siemens Networks et al., "Inbound mobility to H(e)NB: defining the boundaries," 3GPP TSG-RAN WG3 Meeting #63bis, R3-090894, Seoul, Korea (Mar. 23-27, 2009).
Qualcomm Europe, "Reserving a portion of the PCI space for non-macro cells," 3GPP TSG RAN WG2 LTE RRC, R2-083267 (Jun. 30-Jul. 4, 2008).
Qualcomm Europe, "UE-assisted heuristic detection of PCI collision," 3GPP TSG-RAN WG2 #63bis, R2-085380, Prague, Czech Republic (Sep. 29-Oct. 3, 2008).
Qualcomm Europe. "Optimized handover in the presence of PCI confusion," 3GPP TSG RAN WG2 62bis, R2-083268 (Jun. 30-Jul. 4, 2008).
Samsung, "Hybrid cell and PCI-split," 3GPP TSG RAN WG2 #65 bis. R2-09xxxx, (Mar. 2009).
Telecom Italia et al., "Way forward for handover to HeNB," 3GPP TSG-RAN WG2 Meeting #63, R2-084736 (Aug. 18-22, 2008).
Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.4.0 (Mar. 2008).
Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.8.0 (Mar. 2009).
Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.11.0 (Dec. 2009).
Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 9)", 3GPP TS 36.300, V9.2.0 (Dec. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.5.0, (Mar. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.8.0, (Dec. 2009).
Third Generation Partnership Project, "Technical Specification Group Radio Access Network; Evolved Universal Terrestrial Radio Access (E-UTRA) Radio Resource Control (RRC); Protocol Specification (Release 9)", 3GPP TS 36.331, V9.1.0, (Dec. 2009).
Motorola et al., "Open Access, Hybrid Access and closed H(e)NBs, and Macro eNBs," 3GPP TSG-RAN WG2#, R2-092310, Seoul, South Korea (Mar. 23-27, 2009).
Qualcomm Europe, "Connected mode mobility in the presence of PCI confusion for HeNBs," 3GPP TSG-RAN WG2#, R2-092113, Seoul, South Korea (Mar. 23-27, 2009).
Samsung, "Hand-in to a CSG cell," 3GPP TSG RAN WG2 #65bis, R2-092404, Seoul, South Korea (Mar. 23-27, 2009).
Telecom Italia et al., "Way forward for handover to HeNB," 3GPP TSG-RAN WG2 Meeting #63, R2-084534, Jeju, Korea (Aug. 18-22, 2008).

METHOD AND APPARATUS OF RESOLVING PCI CONFUSION FOR PROVIDING INBOUND MOBILITY TO CLOSED SUBSCRIBER GROUP

CROSS REFERENCE TO RELATED APPLICATION

This application is a continuation of U.S. patent application Ser. No. 12/759,908 filed Apr. 14, 2010, which claims the benefit of U.S. Provisional Application Ser. No. 61/169,190 filed on Apr. 14, 2009; U.S. Provisional Application Ser. No. 61/185,793 filed on Jun. 10, 2009; U.S. Provisional Application Ser. No. 61/218,820 filed on Jun. 19, 2009; U.S. Provisional Application Ser. No. 61/220,226 filed on Jun. 25, 2009; and U.S. Provisional Application Ser. No. 61/255,251 filed on Oct. 27, 2009, all of which are hereby incorporated by reference as if fully set forth herein.

FIELD OF INVENTION

This application is related to wireless communications.

BACKGROUND

Basic support for operation with a home Node-B (HNB) or home evolved Node-B (HeNB) (hereinafter collectively referred to as HNBs) has been introduced into Release 8 of third generation partnership project (3GPP) specifications for wideband code division multiple access (WCDMA), long term evolution (LTE) and other cellular standards. An HNB is meant to be similar to the wireless local area network (WLAN) access point (AP), and is to be designed in a manner that allows access to cellular services to users over extremely small service areas, (e.g., homes or small offices). This may be useful in areas where cellular networks have not been deployed or legacy radio access technology (RAT) coverage exists, as well as in areas where cellular coverage may be faint or non-existent for radio related reasons, (e.g., underground metro or shopping mall). The subscriber (e.g., an individual or an organization), may deploy an HNB over an area where such service is desired.

An HNB may be deployed as a closed subscriber group (CSG) cell or a hybrid cell. A CSG cell is only accessible to members of the CSG. A hybrid cell is accessible to any wireless transmit/receive unit (WTRU), but may provide better or privileged service or quality of service (QoS) to members of the CSG.

FIG. 1 shows an example of a conventional HeNB deployment in a wireless communication system 100. The wireless communication system 100 includes an LTE macro-cell 105, a 3GPP system cell 110, a higher network node (e.g., gateway) 115 and/or a mobility management entity (MME)/serving general packet radio service (GPRS) support node (SGSN) 120. The higher network node 115 is responsible for coordinating the operation of several HeNBs 125A, 125B and 125C. Alternatively, the MME/SGSN 120 may be responsible for coordinating the operation of HeNBs 125A, 125B and 125C. The MME is the LTE equivalent of a 3G/2G SGSN. The relationship between the LTE macro-cell 105 and the 3GPP system 110, (e.g., WCDMA/global system for mobile communications (GSM)), is that there may be areas where the coverage of these two technologies overlap. This overlap in coverage is similar to simultaneous coverage of GSM and WCDMA technologies. The higher network node 115 is likely to be a gateway function which interfaces with the MME/SGSN 120. As a gateway, the role of the higher network node 115 may be to act as a single macro-cell towards the MME/SGSN 120 while supporting several small home cells.

FIG. 2 shows an LTE wireless communication system 200 including a WTRU 205, a serving CSG cell 210, and a neighbor CSG cell 215. To complete an inbound handover to a CSG cell in the LTE wireless communication system 200, the WTRU 205 needs to measure and report the CSG cell to the network. However, CSG cells are prone to physical layer cell identity (PCI) confusion, which is when two different CSG cells in the neighborhood of a radio network controller (RNC) or eNB, where the WTRU is initially connected, utilize the same PCI. PCI confusion may also exists if the WTRU has to handover to a CSG cell which it is not a member of (e.g., hybrid cell) A proposed solution has been for the WTRU to report the CSG cell global identity (CGI) to the network. Alternatively, another proposed solution is for the network to resolve the PCI confusion itself (i.e., map the PCI to the CGI), and then, if required, request the WTRU to report the CGI when handover occurs. But a reliable method and apparatus for resolving the PCI confusion is still desired.

SUMMARY

Method and apparatus for providing inbound mobility to CSG and hybrid cells are described. A WTRU reads the CGI of a neighbor cell and reports it to a network of CSG cells. The network then maps the CSG cell's PCI to the CGI and, if required, requests the WTRU to read the CGI at handover.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment.

When referred to hereafter, the terminology "evolved Node-B (eNB)" includes but is not limited to a base station, a site controller, an access point (AP), or any other type of interfacing device capable of operating in a wireless environment.

In the following embodiments the terminology "measurement report" may be used to refer to a radio resource control (RRC) message. In addition, the terminology "CSG identity" or "identity of hybrid or CSG cell" may refer to the CGI (CSG identifier) or more generally it may refer to any measurement taken of the CSG or hybrid cell which may help the network identify the cell, such as a timing difference between the serving cell and the CSG or hybrid cell.

Figure 1:
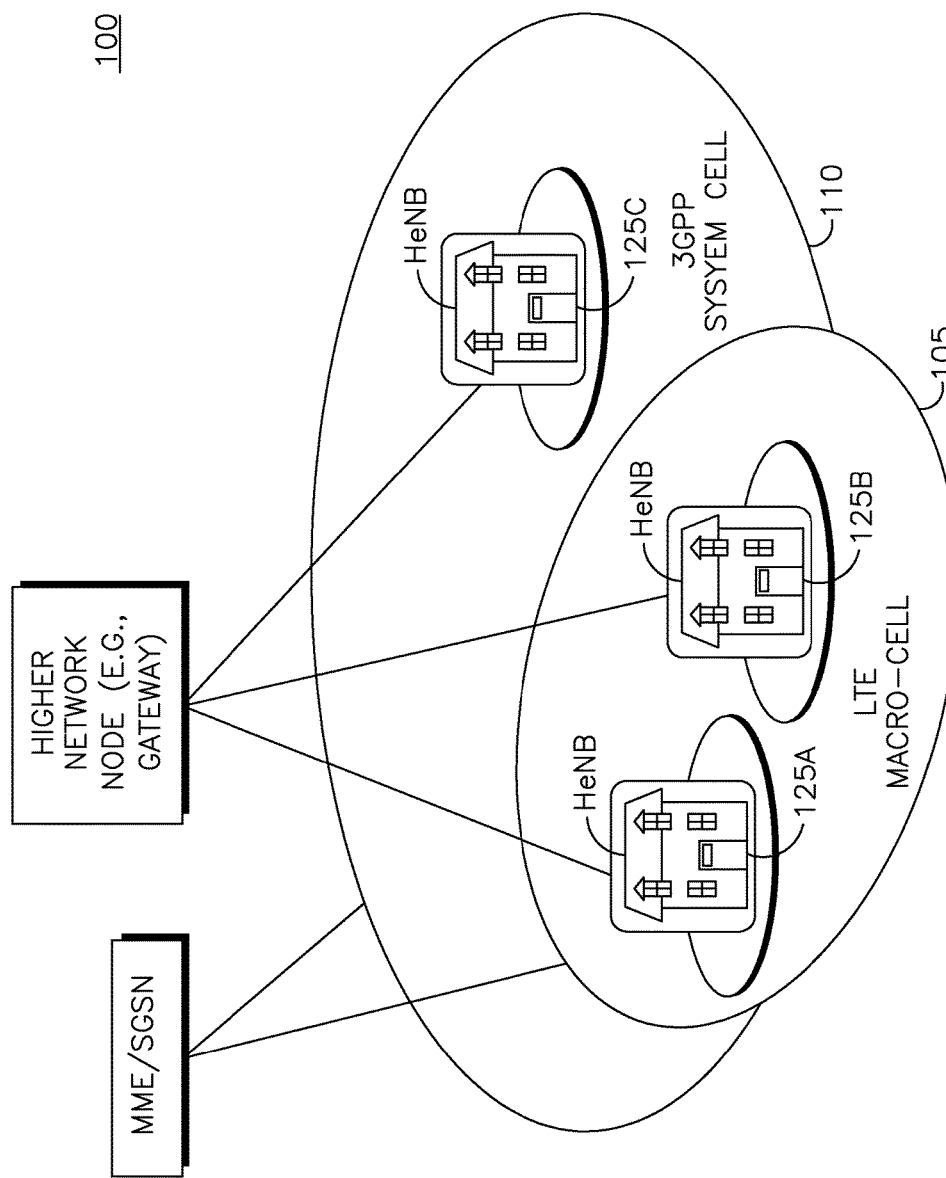
FIG. 1 shows an example of a conventional HeNB deployment in a wireless communication system.
Figure 2:
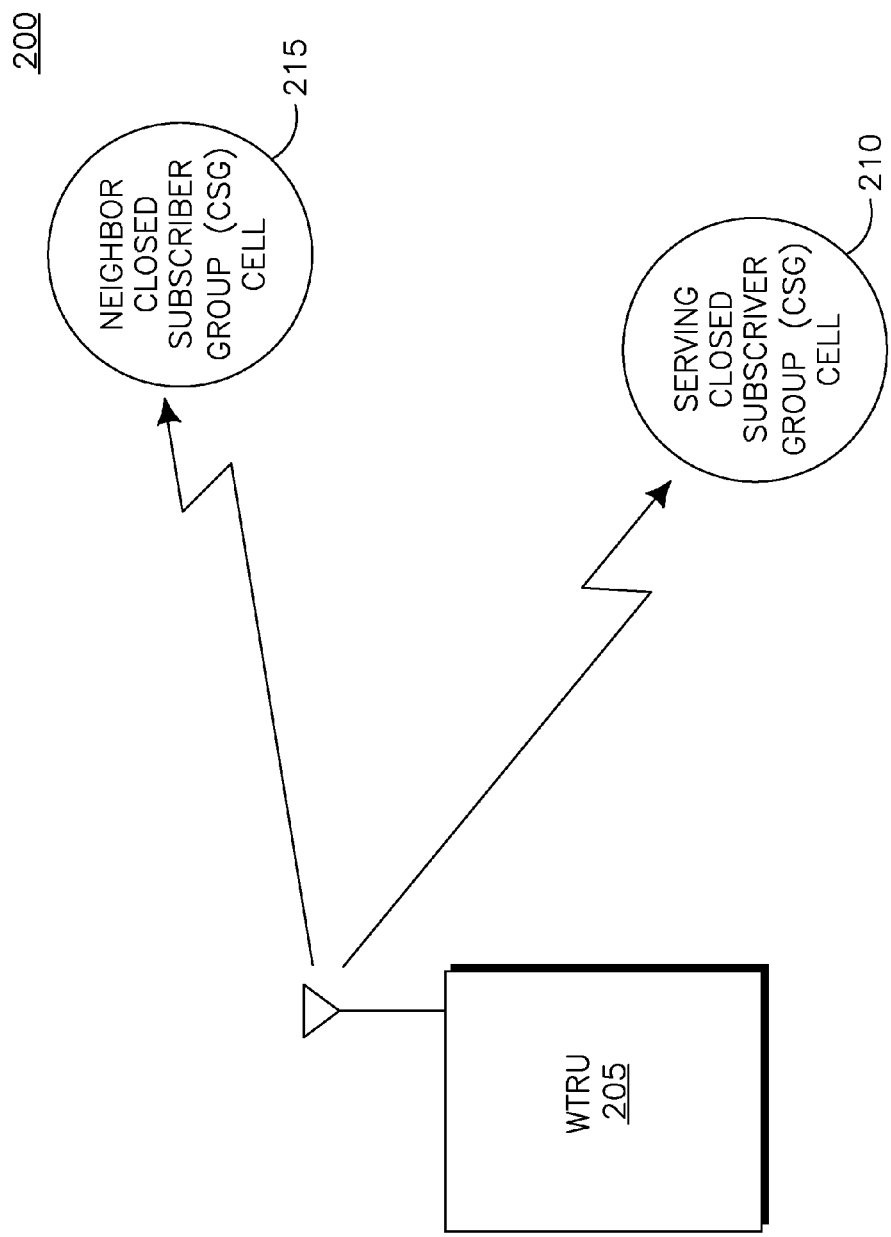
FIG. 2 shows an LTE wireless communication system in accordance with one embodiment.
Figure 3:
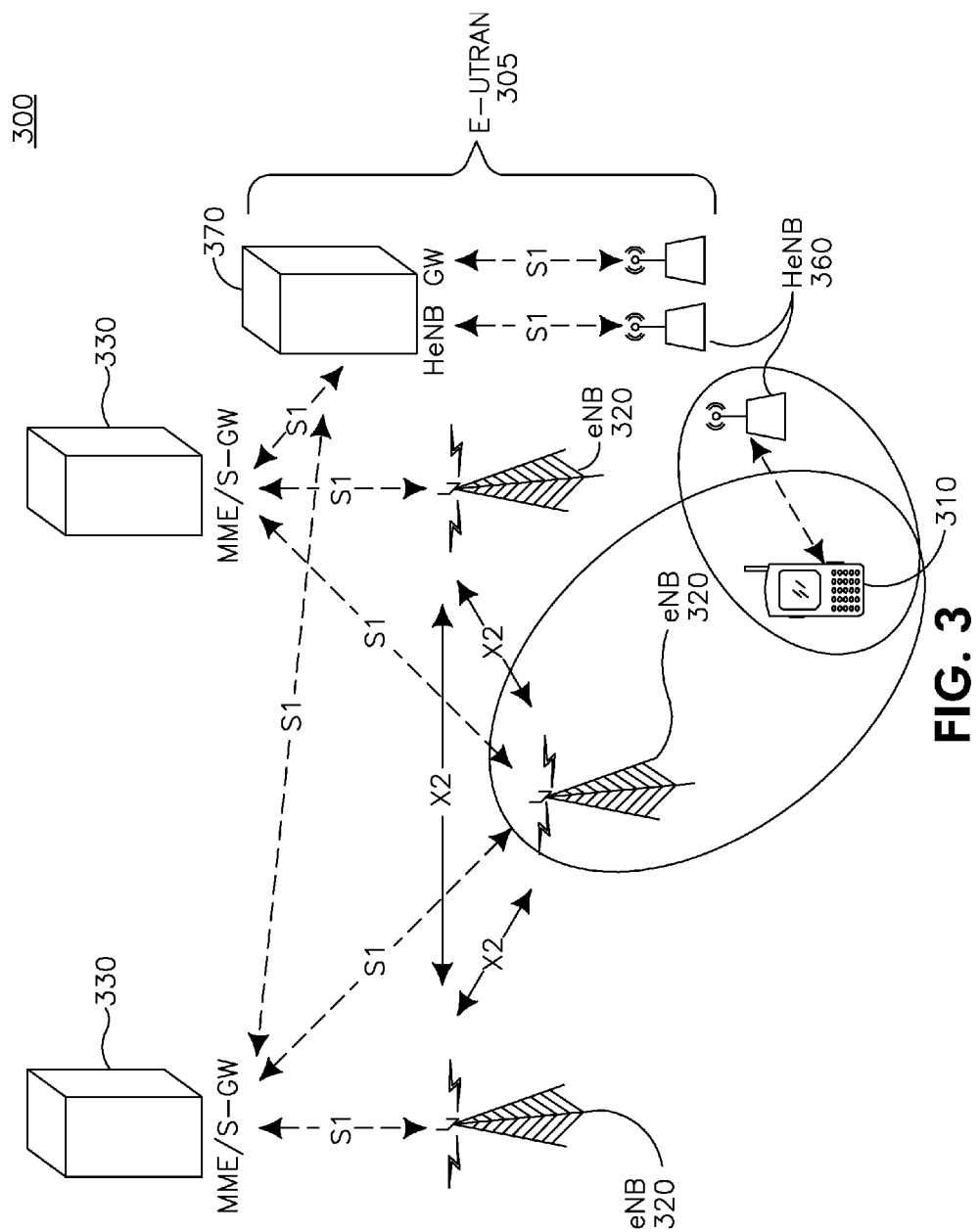
FIG. 3 shows an LTE wireless communication system/access network.

FIG. 3 shows a Long Term Evolution (LTE) wireless communication system/access network 300 that includes an Evolved-Universal Terrestrial Radio Access Network (E-UTRAN) 305. The E-UTRAN 305 includes several evolved Node-Bs, (eNBs) 320 and Home eNodeBs (HeNBs) 360. The WTRU 310 is in communication with an eNB 320 and a H(e)NB 360. The eNBs 320 interface with each other using an X2 interface. Each of the eNBs 320 interface with a Mobility Management Entity (MME)/Serving GateWay (S-GW) 330 through an S1 interface. The HeNBs 360 are also connected to a HeNB Gateway (HeNB GW) 370 through a S1 interface. The HeNB 360 and the HeNB GW 370 connect to the MME/S-GW 330 through the S1 interface. The HeNB GW 370 appears to the MME/S-GW 330 as an eNB 320. The HeNB GW 370 appears to the HeNB 360 as an MME/S-GW 330.

Although a single WTRU 310, three eNBs 320 and three HeNBs 360 are shown in FIG. 3, it should be apparent that any combination of wireless and wired devices may be included in the wireless communication system/access network 300.

Figure 4:
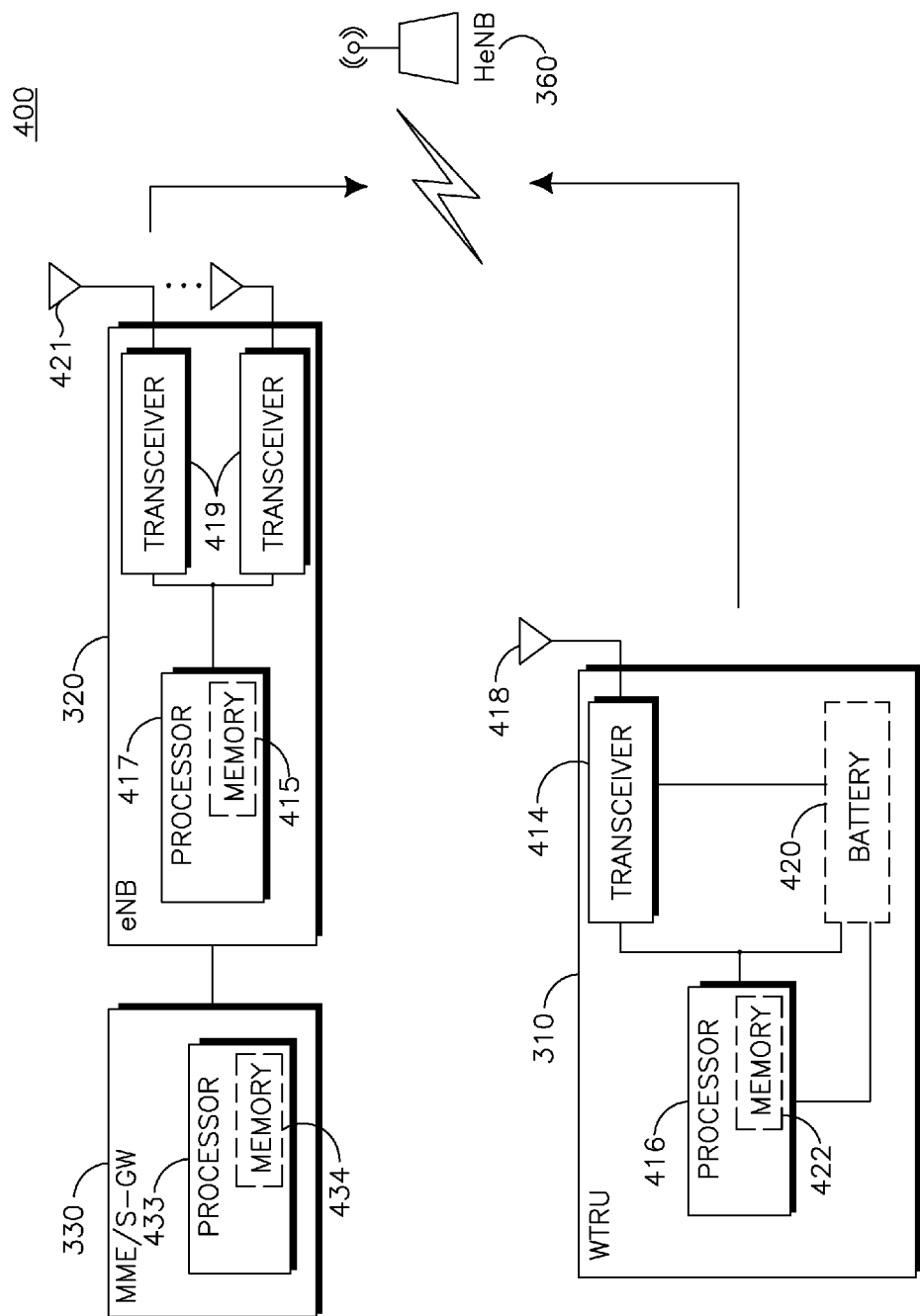
FIG. 4 shows an example of an LTE wireless communication system shown in FIG. 3.

FIG. 4 shows an example of an LTE wireless communication system 400 including the WTRU 310, the eNB 320, and the MME/S-GW 330. As shown in FIG. 4, the WTRU 310, the eNB 320 and the MME/S-GW 330 are configured to perform a method of resolving PCI confusion for inbound mobility to CSG cells and hybrid cells.

In addition to the components that may be found in a typical WTRU, the WTRU 310 includes a processor 416 with an optional linked memory 422, at least one transceiver 414, an optional battery 420, and an antenna 418. The processor 416 is configured to perform a method of resolving PCI confusion for inbound mobility to CSG cell and hybrid cell. The transceiver 414 is in communication with the processor 416 and the antenna 418 to facilitate the transmission and reception of wireless communications. In case a battery 420 is used in the WTRU 310, it powers the transceiver 414 and the processor 416.

In addition to the components that may be found in a typical eNB, the eNB 320 includes a processor 417 with an optional linked memory 415, transceivers 419, and antennas 421. The processor 417 is configured to perform a method of resolving PCI confusion for inbound mobility to CSG cell and hybrid cell.

The transceivers 419 are in communication with the processor 417 and antennas 421 to facilitate the transmission and reception of wireless communications. The eNB 320 is connected to the MME/S-GW 330 which includes a processor 433 with an optional linked memory 434. The MME/S-GW 330, eNB 320, and WTRU 310 are in communication with the HeNB 360.

A HeNB may comprise a processor for processing data and commands, a transmitter for sending information, a receiver for receiving data, and an antenna coupled to the transmitter and the receiver for transmitting and receiving stat across the wireless interface.

It is understood that the concepts described herein are also applicable to other wireless technologies such as the universal mobile telecommunications system (UMTS). For the case of UMTS, the equivalent terminology for PCI may be primary scrambling code (PSC).

Two methods are proposed. A WTRU 310 is configured to read the CGI of a neighbor cell and report it to the network. And, a network is configured to map the CSG cell's PCI to the CGI. For example, the network may signal different predefined thresholds for the serving cell and the neighbor cell. When the serving cell goes above the higher threshold or goes below the lower threshold, the WTRU 310 may report the serving cell to the network. The WTRU 310 may use a similar reporting method for a neighbor cell. Based on the signal strength or signal quality of the serving cell or the CSG neighbor cell, the network may decide whether to ask the WTRU 310 to read the neighbor cell system information (SI) for the CGI, or whether to resolve the PCI confusion itself. The network may also use the existing thresholds for event reporting instead of determining new thresholds.

If the signal strength or signal quality of the serving cell is above a threshold, then irrespective of the signal strength or quality of the neighbor cell, the network may request the WTRU 310 to report the CGI of the CSG neighbor cell. Depending on the signal strength or quality of the CSG neighbor cell, the network may possibly determine whether smaller gap duration (or periodicity of DRX cycle, or gap length) is enough for the WTRU 310 to read SI of the neighbor cell, or whether a larger periodicity of DRX cycle is required. If the CSG neighbor cell is strong, then the WTRU 310 may be able to read the neighbor cell SI, and thus may need smaller gap duration. Alternatively, the WTRU 310 may autonomously determine the required gap duration based on quality of channel reception from the neighbor cell, and signal this required gap duration to the network.

Alternatively, if the signal strength or signal quality of the serving cell is below a threshold, the network may resolve the PCI confusion itself. Depending on how strong the signal strength or quality neighbor cell is, the network may or may not ask the WTRU 310 to read SI of the CSG neighbor cell at handover to confirm whether the CSG neighbor cell is in the white list of the WTRU 310. If the neighbor cell signal strength or quality is not strong, the network may not ask the WTRU 310 to read the neighbor cell SI at handover. If the neighbor cell signal strength is strong, the network may ask the WTRU 310 to read the SI of the neighbor cell at handover since the WTRU 310 may be able to read the SI in the very first instance. The WTRU 310 may also use signal strength or signal quality threshold for the CSG neighbor cell. The WTRU 310 is aware of whether it should attempt reading the SI of the CSG cell at handover based on the signal strength, or quality, of the cell at handover, or at a specified period of time before handover. The signal strength or signal quality threshold may be pre-defined or pre-signaled by the network.

Figure 5:
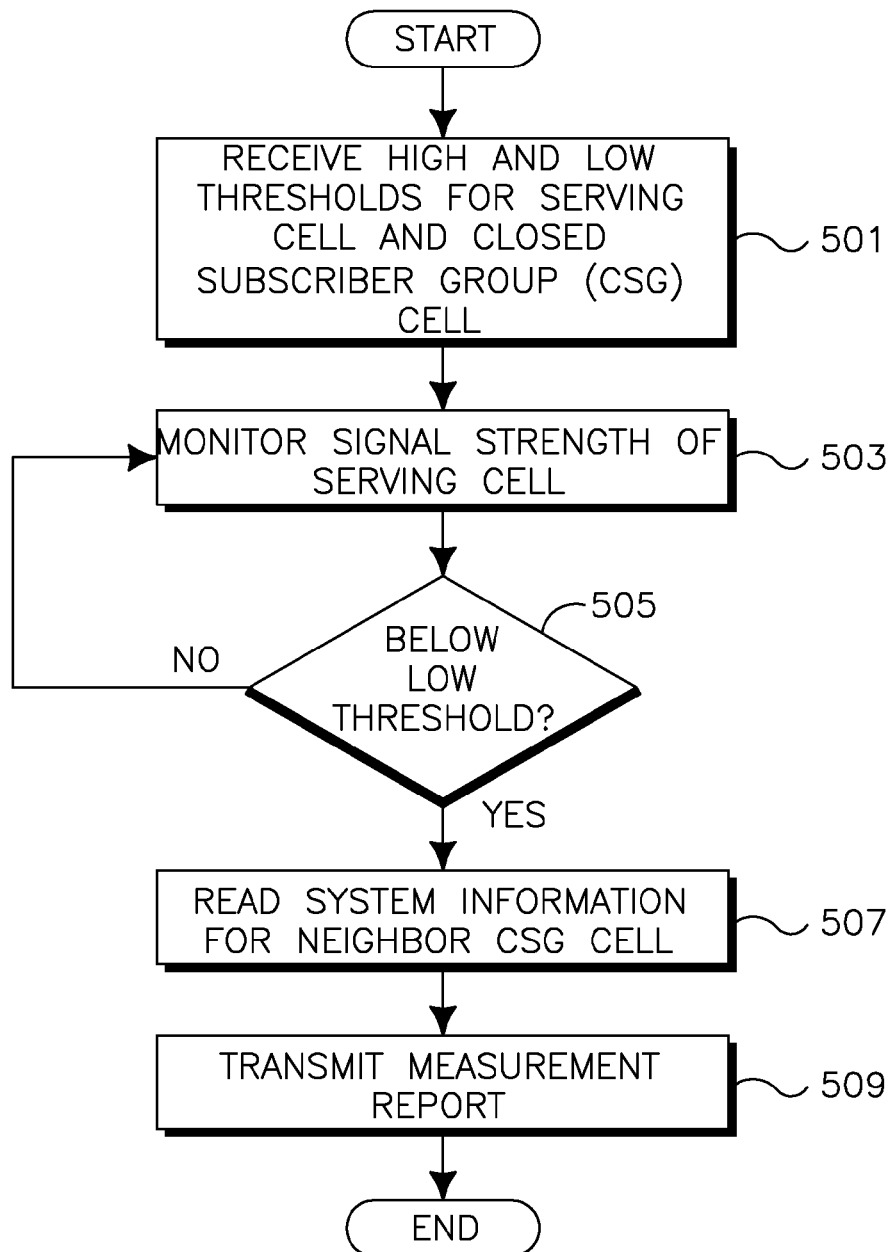
FIG. 5 shows a WTRU based method of measuring SI in a neighbor CSG cell and reporting the SI to the network.

FIG. 5 shows a WTRU based method of measuring SI of a neighbor CSG cell and reporting the SI to the network 500. The WTRU 310 is configured to receive high threshold and low threshold of the current serving cell and at least one neighbor CSG cell 501. The WTRU 310 is configured to monitor the signal strength of the current serving cell 503, and is configured to and compare the measured signal strength to the low threshold for the serving cell. If the measured signal strength is below the low threshold for the serving cell 505, the WTRU 310 begins reading the SI from the neighbor CSG cell 507. The WTRU 310 transmits a measurement report 509 containing the SI of the neighbor CSG cell. The measurement report may include the signal strength or signal quality for the cell as identified by its PCI. The measurement report may further include information contained in the SI of the neighbor CSG cell including by not limited to CGI.

Figure 6:
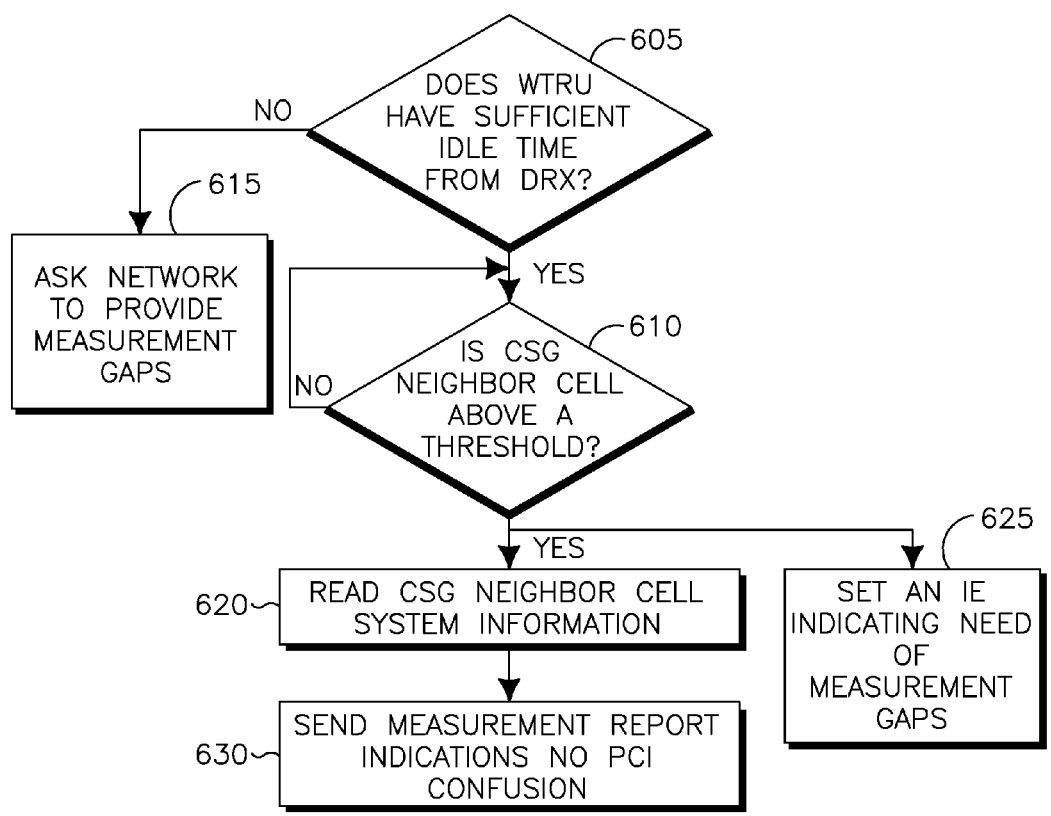
FIG. 6 is a block diagram illustrating WTRU based procedure to read neighbor cell SI for CGI.

FIG. 6 is a block diagram illustrating WTRU based procedure for reading neighbor cell SI representing CGI 600. The WTRU 310 determines if it has sufficient idle time from discontinuous reception (DRX) 605, and when the WTRU 310 determines that a CSG neighbor cell is above a threshold 610, it reads the CSG neighbor cell SI 620. The threshold above which the CSG neighbor cell needs to be may be signaled by the network on the SI or in dedicated RRC message, or may be determined by the WTRU autonomously. Furthermore, there may be a minimum periodicity of the DRX cycle needs to be for the WTRU 310 to read the neighbor cell SI. The minimum length may be signaled by the network in the SI or in the dedicated RRC message. The signal strength threshold and minimum periodicity of the DRX cycle may be received by RRC signaling either dedicated or broadcast.

Additionally, there may be a threshold that allows the WTRU 310 to implicitly extend the DRX duration and thereby extend the opportunity to perform measurements on CSG neighbor cells.

If the WTRU 310 is able to read the CSG neighbor cell's CGI 620, the WTRU 310 may be configured to send a measurement report to the network indicating that it has resolved the PCI confusion 630. The measurement report may contain the PCI of the CSG neighbor cell, an information element (IE) indicating that the PCI confusion is resolved and, optionally, the neighbor cell CGI. Hence, there may be two measurement reports for certain neighbor cells, whereby the first measurement report is sent when the CSG neighbor cell signal strength reaches or crosses a particular threshold, and the second measurement report is sent when the WTRU 310 reads the CSG neighbor cell SI. Alternatively, the WTRU 310 may combine the two measurement reports into one measurement report by attempting to read the neighbor cell SI when a time-to-trigger (TTT) timer is running. When a measurement report is event-triggered, the measurement report is only sent when the condition to send has been true for a TTT. The neighbor cell CGI SI may also be piggybacked as part of an existing RRC message.

If the WTRU 310 has no idle time from DRX available to read the CSG neighbor cell SI 605, then the WTRU 310 may be configured to send a measurement report or any other RRC message to the network asking to be provided with a measurement gap 615. Alternatively, when the WTRU 310 reports a neighbor cell to the network using the existing measurement reports, (e.g., when the neighbor cell signal strength is above a particular threshold 610), the WTRU 310 may send an IE indicating that it needs a measurement gap 625 to read the neighbor cell SI. This IE may also be piggybacked as part of an existing RRC message.

Alternatively, or in addition, the WTRU 310 may also report to the network, within the measurement report or any other RRC message, the length of the measurement gap it needs to read the neighbor cell SI, and whether the WTRU 310 requires one contiguous gap or a plurality of smaller gaps. The WTRU 310 may also specify the number of gaps it would need to read the CSG neighbor cell SI 625.

Figure 7:
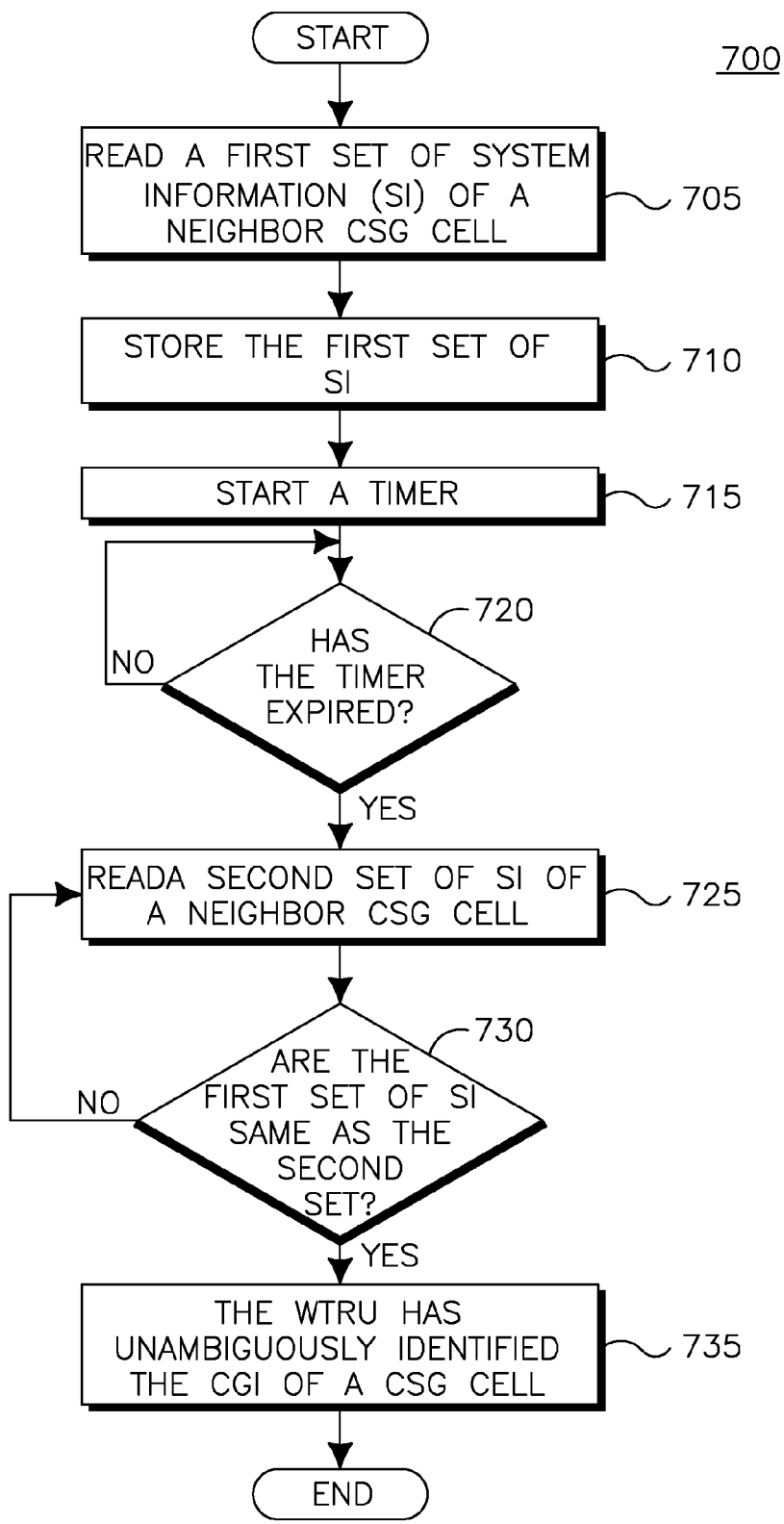
FIG. 7 shows a flow diagram for a method of determining validity for PCI to CGI mapping according to one embodiment.

In one embodiment, a method of determining validity for PCI to CGI mapping is provided. FIG. 7 shows a flow diagram for a method of determining PCI to CGI mapping 700. The WTRU 310 is configured to read a first set of SI of a neighbor CSG cell 705 including the PCI or CGI. The WTRU 310 may be configured to store the first set of SI for the neighbor CSG cell including the PCI 710. When the SI is read 705 and stored 710, the WTRU 310 may be configured to start a timer 715. The timer may start when the WTRU 310 starts acquiring the SI of the neighbor CSG cell. The timer may be configured to indicate the period during which the PCI and CGI remains valid. When the timer expires 720, the WTRU 310 may be configured to read (i.e., retrieve) a second set of neighbor's SI 725. The WTRU 310 may compare the first set of SI with the second set of SI to identify the CGI of a CSG cell 730. In a case that the first set of SI matches the second set of SI, the WTRU 310 has unambiguously identified the CGI of a CSG cell 735. In a case that the WTRU 310 has moved from one cell to another, the validity timer may prevent the WTRU 310 from reporting the wrong CGI to the network when reporting a cell of a certain PCI. Resolving PCI confusion means that the WTRU 310 has unambiguously identified the identity (CGI) of a CSG cell.

The WTRU 310 may be required to know the time or conditions for which the PCI to CGI mapping is valid, and the conditions under which the WTRU 310 is required to read the SI of the neighbor cell. The WTRU 310 may move away from the neighbor CSG cell for which it read the CGI, and encounter the same PCI on another CSG cell. In this case, the WTRU 310 may then have to read the neighbor cell SI again. The WTRU 310 may determine if it needs to re-read neighbor cell SI, or conditions for which the WTRU 310 no longer considers the SI as valid which results in clearing the stored information with the associated PCI.

To make this determination, the WTRU 310 may use a validity timer 720 as described above. The duration for the validity timer may be pre-defined or signaled by the network. Alternatively, the validity timer may be started upon transmission of the measurement report containing the concerned PCI and associated CGI. Alternatively, the timer may be started when the WTRU 310 stops detecting the concerned PCI. Alternatively, the timer may be stopped upon determining that any of the conditions described below are met.

Thus once the validity timer expires or is stopped, the WTRU 310 may then read SI of the neighbor again to determine the CGI. Alternatively, the WTRU 310 may wait for a network indication to re-read the SI instead of the WTRU 310 autonomously re-reading it. The network may signal one common validity time period for all CSG cells, or the network may signal one validity timer period per CSG cell.

Alternatively, an implicit rule may be defined that requires that, whenever the WTRU 310 performs a reselection procedure or selects a new public land mobile network (PLMN), the WTRU 310 may be configured to read the SI of all of the neighbor cells to perform the PCI to CGI mapping. The WTRU 310 may be configured to read the SI of all of the neighbor cells even if they have been read before while the WTRU 310 was on the previous cell or PLMN). Additionally, once the WTRU 310 performs a reselection or a PLMN selection, the network may signal the list of CSG neighbor cells whose SI the WTRU 310 should re-read to perform the PCI to CSG mapping.

Figure 8:
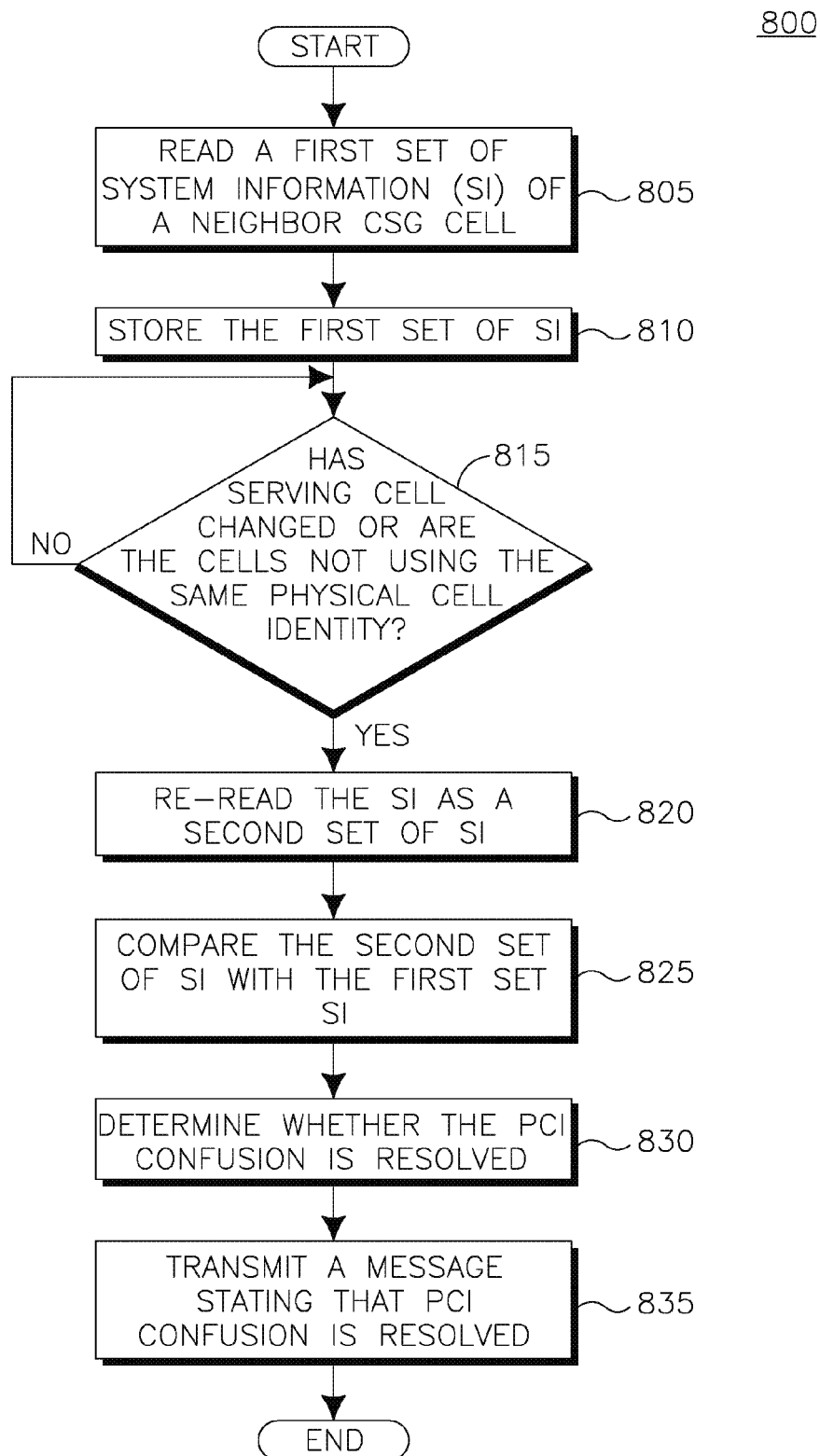
FIG. 8 illustrates a block diagram for a method of determining validity for PCI to CGI mapping according to another embodiment.

FIG. 8 illustrates a block diagram for a method of determining validity for PCI to CGI mapping according to another embodiment 800. The WTRU 310 is configured to read a first set of a required SI of a neighbor CSG cell 805 including the PCI or CSG ID. The WTRU 310 may be configured to store the acquired SI for the neighbor CSG cell and the PCI 810. The WTRU 310 is configured to determine whether the mapping may be considered invalid. The WTRU 310 is configured to determine if the serving cell has changed, that is, an inter-cell handover has occurred, and whether the source cell or the target cell are not using the concerned PCI 815. In a case that the determination is positive in 815, the WTRU 310 is configured to re-read a second set of the SI 820. The WTRU 310 is configured to compare the second set of SI with the first set of the SI 825 to determine whether the PCI confusion is resolved 830. The WTRU 310 is configured to transmit a message (i.e., measurement report) to the network stating that the PCI confusion is resolved 835.

Alternatively, the mapping may be considered invalid when the WTRU 310 may be configured to send a measurement report with no cell using the concerned PCI. This may occur when the WTRU 310 moves away from the concerned cell. Alternatively, the mapping may be considered invalid when the WTRU 310 may be configured to detect PCI collision for this PCI, that is, two distinct cells using the same PCIs may be heard at a significant level at a given location. The mapping may be considered invalid when the WTRU 310 is instructed to handover to a cell with the concerned PCI but the handover fails, or fails due to the WTRU 310 being denied access. When the mapping becomes invalid, the WTRU 310 may signal to the network that the mapping is invalid or re-attempt decoding the CGI the next time the PCI is measured, or re-attempt decoding only when the network instructs the WTRU 310 to perform reading SI.

Alternatively, the network may signal the CSG neighbor cells, either in the SI or RRC messages, indicating the CSG neighbor cells that the WTRU 310 needs to re-read the CGI. The WTRU 310 may be configured to read the SI of the signaled CSG cells based on implicit conditions or timer values as mentioned above with respect to FIG. 7. For the remaining CSG cells, the WTRU 310 may retain the PCI to CSG mapping.

Alternatively, the network may use an IE with a re-read CSG neighbors signaled in the RRC messages or SI. When the IE is present, or set to true, the WTRU 310 may re-read CSG neighbor cell SI to confirm the PCI to CGI mapping. The IE may be one common IE set for all CSG cells, or the network may signal one IE per CSG cell.

Alternatively, the WTRU 310 mapping between the CGI and a predefined PCI (used by a CSG cell or a hybrid cell) is considered valid when a set of WTRU conditions or measurements match a set of conditions or measurements where the CGI had been previously measured (i.e., fingerprint, measured geographic position). The conditions or measurements may be the identity of the serving macro cell or the neighboring macro cell. The mapping may remain valid for a pre-defined or signaled duration, or until notification from the network, or until the WTRU 310 determines that the mapping is no longer valid. For example, the mapping may no longer be valid in a case after handover failure to a CSG cell that matches the concerned fingerprint occurs and the CSG cell is supposed to be an allowed CSG (i.e., within the allowed range).

Alternatively, when the WTRU 310 moves out of a location area (LA) or tracking area (TA) or routing area (RA), the WTRU 310 is triggered to measure the CSG or CGI of the neighboring cells, or to consider the acquired information as invalid. (i.e., a tracking area or location area update or routing area update or user registration area (URA) update occurs). The WTRU 310 may measure all neighbors within this area, if it is in idle state, or cell paging channel (CELL_PCH)/URA_PCH state, or cell forward channel (CELL_FACH) state. If the WTRU 310 is in an active mode, the WTRU 310 measures the CGI and CSG, if the quality of the neighbor cell is above a threshold for a configured amount of time or if the network indicates to the WTRU 310 that it should measure the channel.

The WTRU 310 may consider the acquired SI for a neighbor CSG cell with a corresponding PCI as being invalid when the quality of the neighbor CSG cell falls below a threshold. Optionally, the WTRU 310 may consider the SI as invalid if the quality or signal level of the neighbor CSG cell is below a threshold for a configured or predefined period of time. The quality may correspond to the common pilot channel (CPICH) energy per chip (Ec)/noise power spectral density (No) or the reference signal received quality (RSRQ) for a UMTS or LTE system, respectively. The signal level may correspond to the CPICH received signal code power (RSCP) or the reference signal received power (RSRP) for a UMTS or a LTE system, respectively. The threshold may be a network configured threshold or a WTRU determined threshold. The parameter may be configured by the network as a specific CSG threshold or by using an existing absolute threshold value that is configured for other intra-frequency or inter-frequency events. For example, S-measure may be used or any other threshold. When the measurement (reference signal received power (RSRP) or reference signal received quality (RSRQ)) is above S-measure, the WTRU 310 is not required to perform certain measurements. Alternatively, an offset to any of the configured thresholds may be added by the WTRU 310 to determine the new threshold for SI validity. Alternatively, the threshold is determined by subtracting a pre-defined or signaled offset from the signal level or quality of the neighbor cell at the time the WTRU 310 had started or finished acquiring the SI of the neighbor cell.

The reduced quality or signal level of the neighbor cell may imply that the WTRU 310 is moving away from the neighbor CSG cell and the probability of encountering a different CSG cell with the same PCI coverage may increase. Alternatively, the quality or signal level of the neighbor cell is below the reporting range for any of the configured measurement events and criteria.

In case the concerned neighbor cell triggers a measurement event, either a normal event or a CSG-specific one, such as A3 in the case of LTE, the WTRU 310 may consider the SI as invalid when the condition that had triggered the event is no longer true or when the leaving condition for the event becomes true. In other words, the neighbor cell is no longer a predefined offset better than serving. Event A3 may represent neighbor cell becomes a predefined offset better than the serving cell.

The WTRU 310 may consider the SI of the neighbor cell as invalid after successfully transmitting a measurement report containing the information obtained by acquiring the SI of the cell. In other words, after transmitting to the network the measurement report containing the CGI and other information, the WTRU 310 clears this information from the memory or considers it as invalid.

The WTRU 310 may consider the acquired SI for a neighbor cell as being invalid when the WTRU 310 leaves the fingerprint area, or the geographical area that triggered the measurements. Specifically, upon reporting leaving proximity area message to the network, the WTRU 310 may clear the stored SI for the PCI it has read, if any is stored. Alternatively, this may occur if the WTRU 310 is leaving the current geographical area and entering a new geographical area or fingerprint area where the current PCI is considered to be unlikely. For Example, according to the stored fingerprint information the PCI does not correspond to any of the CSGs stored in the white list.

The WTRU 310 may clear the SI of a neighbor cell and re-acquire the SI if the network sends a message explicitly indicating to the WTRU 310 indicating to acquire a SI for a PCI. The PCI corresponds to a PCI for which SI is stored by the WTRU 310. The message may be measurement control or reconfiguration message.

The WTRU 310 may consider the SI as being invalid when the network sends a measurement to the WTRU 310 to stop inter-frequency or inter-RAT measurements. For example, the WTRU 310 no longer has an inter-frequency or inter-RAT measurement configuration.

Alternatively, the WTRU 310 may consider the SI as being invalid upon changing RRC states such as from idle to connected or vise versa. Alternatively, when a state transition occurs and the WTRU 310 has this information stored, it may inherit and use the same information in the new state until considered invalid as determined by any of the alternatives defined above.

If the SI is considered as invalid, and if a measurement report is triggered, the WTRU 310 may leave the SI report empty. And, if the network would like the WTRU 310 to re-read the SI, it may send an additional explicit signaling as it may have done for the initial reading. Alternatively, the WTRU 310 may clear the content and autonomously re-read the SI during autonomous gaps, without waiting for a network explicit indication. The solutions are applicable to WTRUs in an idle mode or connected mode.

In another embodiment, procedures for reporting CGI to source cell and requesting gaps are provided. The following describes multiple methods, illustrated in FIGS. 9 and 10, for reporting the identity of a CSG cell or hybrid cell whose PCI has been measured by the WTRU 310 (900 and 1000). The methods may be used in combination. In general, reports or other communication from the WTRU 310 to the network may be performed using a measurement report message or any other or new RRC message defined for this purpose.

Figure 9:
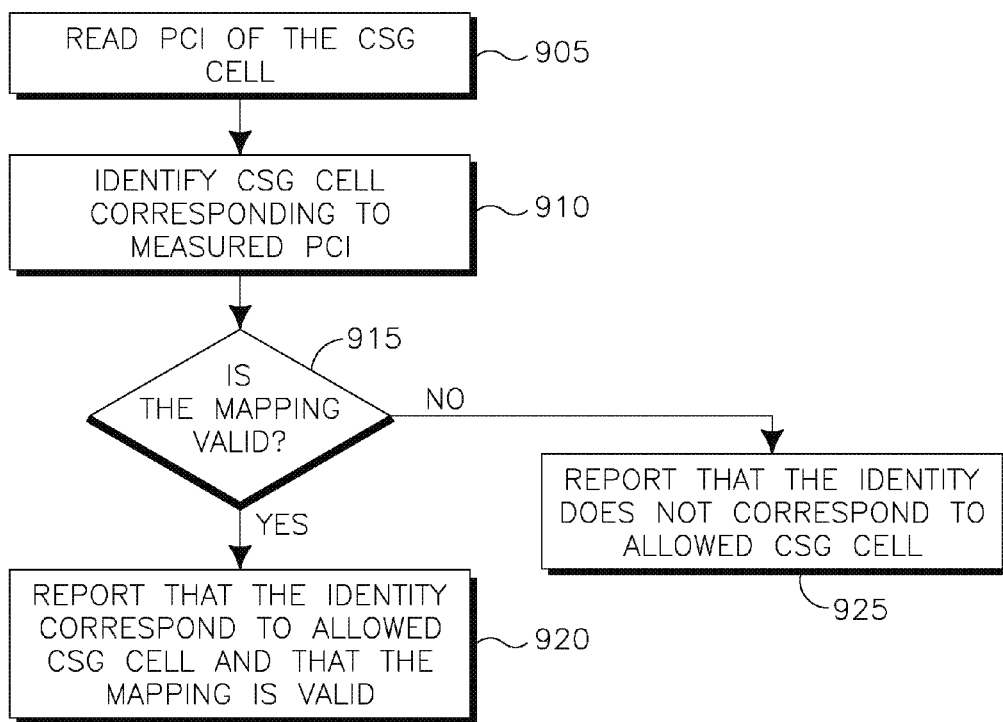
FIG. 9 shows a procedure for reporting CGI to the source cell.

In a first method, illustrated in FIG. 9, the WTRU 310 is configured to read PCI of the CSG cell 905. The WTRU 310 is configured to identify CGI corresponding to the measured PCI used by a CSG cell 910. The WTRU 310 determines whether validity of the mapping is true 915. The WTRU 310 is configured to report to the network (i.e., source cell) the CGI corresponding to the measured PCI used by a CSG cell whenever it has a valid mapping of the CGI for this measured PCI 920 The WTRU 310 reports that the CGI corresponds to an allowed CSG 920. The WTRU 310 is configured to report to the network, in a case that the mapping is not valid, that the CGI of the measured PCI does not correspond to the CSG cell 925.

Optionally, in case the CSG is not allowed, the WTRU 310 only reports this information, and does not report the CGI. Optionally, in case the CSG is not allowed the WTRU 310 does not report the CGI or any additional information. Optionally, the WTRU 310 also reports the time when the mapping is determined. This information may be conveyed in the measurement report containing the PCI of the CSG cell or any other RRC message.

Based on this information the network may initiate a handover procedure to the CSG cell, if it is an allowed CSG, depending on the received signal level of the CSG. In case the WTRU 310 does not report a CGI for a measured PCI used by a CSG cell or hybrid cell, the network may command the WTRU 310 to measure the CGI of that CSG cell and allocate required gaps to facilitate this measurement.

Figure 10:
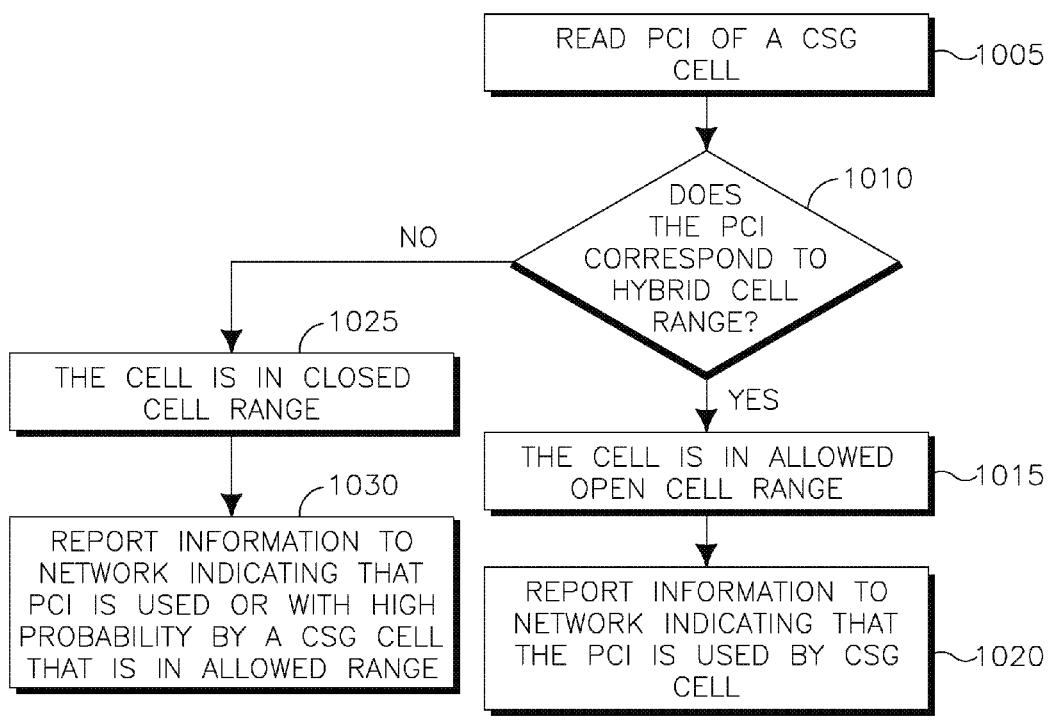
FIG. 10 shows a procedure for requesting gaps from the source cell.

Another method is described and illustrated in FIG. 10 for reporting CGI to the network including the likelihood of the CSG cell that is allowed 1000. The WTRU 310 is aware of the PCI and in general there are 504 unique cell identities (i.e., PCI) grouped into 168 unique cell identity groups. The WTRU 310 is aware of a range of PCI that are reserved for closed cells (i.e., not hybrid cells or the open cells). Any PCI that is outside of the closed cell range is in the hybrid cell range or the open cell range. The WTRU 310 is configured to read PCI of a CSG cell 1005. The WTRU 310 determines whether the PCI corresponds to hybrid cell 1010. If the WTRU 310 detects that the PCI corresponds to a hybrid or open cell (based on the knowledge of a range of PCIs utilized for hybrid or open cells) the WTRU 310 knows that the cell is in allowed range 1015. The WTRU 310 is configured to report information to the network when the WTRU 310 determines that the PCI is or may be used by a CSG or hybrid cell that is allowed 1020. If the cell is in closed cell range 1025, then the WTRU 310 reports information to the network indicating that the PCI is used, or may be used with high probability by a CSG cell that is allowed 1030. The PCI may correspond to a closed cell of which the WTRU is a member.

Determination that the PCI is or may be used with high probability by a CSG cell that is not allowed may be based on the WTRU 310 recognizing a set of conditions or measurements such as fingerprint that are present when the WTRU 310 is in the neighborhood of an allowed CSG cell, allowed hybrid cell or a non-allowed CSG cell. For example, the set of conditions may include the WTRU being geographically around a predefined position and the PCI of the cell matching the PCI used by the allowed CSG cell the last time it was accessed. The reporting may be conveyed in either any measurement report containing the PCI of the CSG cell or any other RRC message. Or, in a measurement report sent as a result of receiving a message from the network instructing the WTRU 310 to provide the identity of the CSG or hybrid cell. Or, in a measurement report sent if a condition indicating urgency of performing the handover is met.

For example, it may be sent upon detection of the hybrid cell or CSG cell above a received signal level, or after expiration or stopping of a timer started upon detection of the hybrid cell or CSG cell above a certain received signal level. The timer may be stopped in case the WTRU 310 successfully decodes the identity of the hybrid cell or CSG cell. The timer may be stopped and the WTRU 310 may successfully decode the identity without allocation of gaps by the network due to opportunities arising from DRX operation. Optionally, the timer may only be used in case signals level from the serving cell, hybrid cell, or CSG cell are such that the handover to the hybrid cell or CSG cell is not urgent.

Examples of conditions for determining the urgency of the handover procedure include, when a signal level of the serving macro cell is below a threshold, when the signal level of the CSG or hybrid cell is above a threshold, or when the difference, in dB, between the signal level of the CSG cell or hybrid cell and the signal level of the serving cell is above a threshold, which may be negative. The latter condition may optionally be used only in case the serving macro cell and target CSG cell or hybrid cell are in the same frequency.

The information may include an indication that the PCI may correspond to an allowed CSG cell, hybrid cell, or a non-allowed CSG cell, and thus the measurement of the CGI is needed, or not needed. In case the indication states that the cell may be allowed, the indication may be equivalent to a request to the network to allocate a gap to facilitate measurement of the CGI. Alternatively, the indication may be interpreted as an indication to the network that the WTRU 310 may attempt or is attempting measurement of the CGI using idle time, and that allocation of a gap may be necessary. In case the indication states that the cell is non-allowed, such indication may be equivalent to a request to the network to not allocate a gap to facilitate measurement of the CGI, or a notification that the cell is not allowed, or that measurement of CGI may not be attempted. Optionally, this information is only sent in case the WTRU 310 does not have a valid mapping of the CGI for this measured PCI. Optionally, the absence of indication means that the PCI may correspond to an allowed CSG cell or hybrid cell. Alternatively, the absence of indication means that the measurement of CGI is not needed.

The information may include presumed or measured CGI of the CSG cell or hybrid cell using the PCI, if available. This may be reported along with an indication of whether the CSG may be allowed. Optionally, in case the CSG is not allowed the WTRU 310 may only report the information, and not report the CGI. Optionally, there may be an indication of the time when the mapping between the PCI and the CGI had been determined, or whether the CGI had just been measured. Optionally, the information is only reported if the mapping between the CGI and the PCI remain valid. Optionally, this is only reported if the WTRU 310 is not aware of any PCI confusion, whereby the PCI of the allowed CSG is also being used by another CSG, within the vicinity of the source cell.

In case the CGI is provided, the network may initiate a handover procedure to the CSG cell depending on the received signal level of the CSG. For example, the WTRU 310 may indicate that the measured PCI corresponds to an allowed CSG. In case the WTRU 310 only reports an indication that the PCI may correspond to an allowed CSG cell or hybrid cell, the network may command the WTRU 310 to measure the CGI of the CSG cell or hybrid cell and/or allocate required gaps to facilitate this measurement. The network may indicate the PCI of the cell whose CGI needs to be measured so that the WTRU 310 knows which PCI is to be measured in case there exists multiple PCIs. If the network knows that the PCI corresponds to a hybrid cell which is always allowed, the network may command the WTRU 310 to measure the identity of the hybrid cell even if the WTRU 310 does not provide the indication. Gap allocation may be indicated in a reconfiguration message or in a measurement control message.

Optionally, the network may allocate gap only after a condition indicating urgency of performing the handover is met. For example, the allocation may be performed upon expiration of a timer that was started upon reception of the message from the WTRU 310 indicating that a detected PCI may correspond to a CSG cell or hybrid cell that may be allowed. The timer may be stopped upon reception of a WTRU message containing the identity of the CSG cell or hybrid cell. This procedure may leave some time for the WTRU 310 to decode the identity of the CSG cell using natural opportunities due to DRX operation, thus avoiding needless configuration of gaps.

Other examples of conditions for determining the urgency of the handover procedure include when a signal level of the serving macro cell is below a threshold, when a signal level of the CSG or hybrid cell is above a threshold, or when the difference, in dB, between the signal level of the CSG cell or hybrid cell and the signal level of the serving cell is above a threshold, which may be negative. The latter condition may optionally be used only in case the serving macro cell and target CSG cell or hybrid cell are in the same frequency.

In case the WTRU 310 only reports an indication that the PCI may correspond to a non-allowed CSG cell, the network may refrain from commanding the WTRU 310 to measure the CGI of the CSG cell and refrain from pursuing with any mobility procedure towards the CSG cell.

The WTRU 310 may attempt the measurement of the CGI during idle time provided by DRX operation and/or measurement gaps, before or after the WTRU 310 is being allocated a gap. The WTRU 310 may initiate the measurement upon detection of the PCI of the CSG cell or hybrid cell. The WTRU 310 may initiate the measurement upon detection of the PCI of the CSG cell or hybrid cell with a received signal strength or quality above a certain threshold. The WTRU 310 may initiate the measurement when the difference, in dB, between the signal level of the CSG cell or hybrid cell and the signal level of the serving cell is above a threshold. The WTRU 310 may initiate the measurement upon expiration of a timer that is started when the PCI of the CSG cell or hybrid cell is detected with a received signal strength or quality above a certain threshold. The timer is being stopped if the signal strength or quality falls below a threshold. The WTRU 310 may initiate the measurement after transmitting the measurement report containing the PCI of the CSG or hybrid cell. Alternatively, the WTRU 310 may initiate the measurement after transmitting the measurement report containing the PCI of the CSG cell or hybrid cell with an indication that the PCI may correspond to an allowed CSG cell or hybrid cell.

To support triggering of measurement reports in any of the above methods, new measurement events may be defined. The definition of distinct events facilitates the use of different thresholds for neighbor CSG cell; or hybrid cell compared to normal cells. Examples of such new events are described below. The events tag names described here are arbitrary: Events H3, H4, H5, and H6 are described.

Event H3 occurs when a CSG cell or a hybrid cell neighbor becomes an offset better than the serving cell. This event is similar to event A3 in the RRC protocol of LTE, but with an additional condition that the neighbor cell is a CSG cell, hybrid cell, or is identified as a potential allowed CSG cell or hybrid cell by the WTRU 310.

Event H4 occurs when a CSG cell or hybrid cell neighbor becomes better than a predefined threshold. This even is similar to event A4, but with an additional condition that the neighbor cell is a CSG cell, hybrid cell, or is identified as a potential allowed CSG or hybrid cell by the WTRU 310.

Event H5 occurs when a serving becomes worse than a predefined threshold1 and CSG cell or hybrid cell neighbor becomes better than a predefined threshold2. This event is similar to event A5, with an additional condition that the neighbor cell is a CSG cell, hybrid cell, or is identified as a potential allowed CSG or hybrid cell by the WTRU 310.

Event H6 occurs when an identity of a neighbor CSG cell or hybrid cell has been successfully measured.

Figure 11:
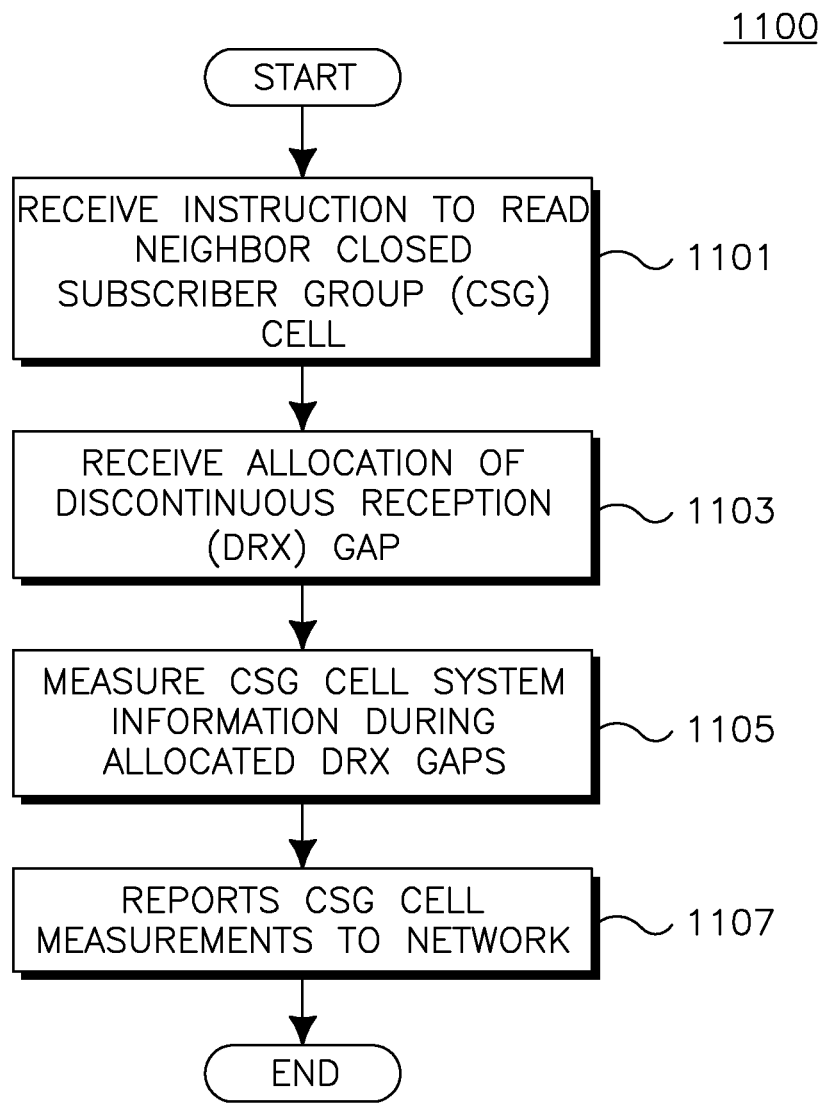
FIG. 11 shows a WTRU reading SI of a neighbor CSG cell and allocating reception resources at the WTRU.

FIG. 11 shows a method for receiving signaling in a WTRU 310 to begin reading SI of a neighbor CSG cell and allocating reception resources at the WTRU 1100. The WTRU 310 is configured to receive a signal to read the SI of at least one neighbor CSG cell 1101. The signal may have been generated by the network in response to the expiration of a timer, or may have been signaled due to an event such as the crossing of a threshold where the signal strength of the serving cell or a CSG cell exceeds or falls below a monitored threshold indicating a handover is not necessary, or alternatively, may be desirable. The WTRU 310 is configured to receive allocation of DRX gaps 1103, which facilitate the measurement of SI from the neighbor CSG cell. The WTRU 310 is configured to read the SI from the neighbor CSG cell during the allocated DRX gaps 1105. When the SI of the neighbor CSG cell has been read, the WTRU 310 is configured to transmit a measurement report to the network containing the SI for the neighbor CSG cell 1107.

In one example, a procedure is provided for a WTRU that handovers to an allowed CSG cell. The WTRU 310 initially is served by a macro cell. The WTRU 310 is configured to detect the PCI of a CSG cell. The fingerprint of this CSG cell matches that of a previously allowed CSG cell. The fingerprint may be the geographical location or the used PCI of the CSG cell. However, the WTRU 310 does not have a valid CSG ID of the cell. The WTRU 310 may attempt to decode the CSG ID during idle periods created by DRX and/or measurement gaps. The WTRU 310 may send a measurement report to the network containing the PCI of the CSG cell and an indication that the CGI needs to be measured. After a predefined delay, the network sends a message allocating gaps to the WTRU 310 to facilitate measurement of the CGI. The WTRU 310 successfully decodes the CGI and finds that the CSG is included in its list of allowed CSGs. The WTRU 310 sends a measurement report including the PCI and the corresponding CGI. The network initiates handover procedure to the CSG cell.

In another example, a procedure is provided for a WTRU that measures a non-allowed CSG cell. The WTRU 310 initially is served by a macro cell. The WTRU 310 detects the PCI of a CSG cell. The fingerprint of this CSG cell matches that of a previously allowed CSG cell. The fingerprint may be the geographical location or the used PCI of the CSG cell. However, the WTRU 310 does not have a valid CSG ID of the cell. The WTRU 310 may attempt to decode the CSG ID during idle periods created by DRX and/or measurement gaps. The WTRU 310 may send a measurement report to the network containing the PCI of the CSG cell, and an indication that the CGI needs to be measured. After a predefined delay, the network sends a message allocating gaps to the WTRU 310 to facilitate measurement of the CGI. The WTRU 310 may decode the CGI and finds that the CSG is not included in its list of allowed CSGs. The WTRU 310 may send a measurement report including the PCI and does not send any indication that the CGI needs to be measured. The network understands that the PCI does not correspond to an allowed CSG cell and does not initiate a handover procedure to the CSG cell.

When the network allocate gaps to assist the WTRU 310 for the measurement of the identity of the CSG cell or hybrid cell, the gaps may be allocated as described below.

A single or finite number of instances of gaps are pre-defined in time. The gaps are not repeated beyond this number of instances. The gaps may be defined in terms of sub-frame intervals with reference to a starting system frame number (SFN) and sub-frame number. If there is more than one instance of gaps, the time interval between the instances may also be indicated or pre-defined.

A gap or sequence of gaps occurs on a periodic basis with a pre-defined or signaled interval between them. The gaps are allocated until one or a combination of the following events occur: the WTRU 310 sends a measurement report, the WTRU 310 sends a measurement report with identity of the CSG cell or hybrid cell, the WTRU 310 sends a measurement report indicating that identity of the CSG cell or hybrid cell cannot be measured, or does not need to be measured (e.g., in case the WTRU 310 does not expect to have access to the CSG cell or hybrid cell), the WTRU 310 sends a measurement report indicating that the signal strength of the CSG cell or hybrid cell is below a threshold, the WTRU 310 is handed over to a new cell (i.e., a CSG cell or any other cell), the WTRU 310 receives a new measurement control or other RRC message from the network indicating that gaps are stopped, or the gaps are allocated when a timer started upon reception of the message allocating the gaps expires. The timer duration may have been indicated in this message.

A method for a WTRU procedure to measure CGI during a gap is provided. Based on the CSG neighbor cell signal quality, it is possible that a significant amount of time is required to decode the master information block (MIB) and then the SIB1 of the neighboring cell. To mitigate this issue the following methods are possible individually or in combination.

There may be multiple gaps defined for reading MIB and SIB1. In other words, the WTRU 310 may be configured to detect and to decode the MIB in a first gap, and detect and decode SIB1 in a second gap. The two gaps may be individually smaller than a single gap where both operations are performed. This is advantageous in terms of minimizing disruption of data transfer.

Alternatively, there may also be multiple gaps defined for reading MIB only or SIB1 only. The WTRU 310 may combine the hybrid automatic repeat request (HARQ) transmissions received from two different gaps. This requires the reservation of one or more HARQ processes. The HARQ processes may not be used during the intervening data transmissions. The reserved HARQ processes may be signaled by the network at the time the gaps are configured. Alternatively, there may be a pre-defined HARQ process that is always used when necessary. In either case the WTRU 310 flushes the corresponding HARQ buffer upon starting reception during the first gap.

A network based method to solve PCI confusion is provided. To allow the network based method of resolving PCI, the network may decide to resolve the PCI confusion if it realizes that the serving cell signal strength is not good and the handover process can not be delayed. If the network is not able to resolve the PCI confusion, it may ask the WTRU 310 to read the SI of the neighbor cell, or it may directly hand over the WTRU 310 to the neighbor cell.

In the handover command sent by the network or in any other RRC message (i.e., measurement control or the like), the network may set an IE which may indicate whether the WTRU 310 may read the SI of the CSG neighbor cell. Alternatively, the presence of the IE may indicate that the WTRU 310 is required to read the SI of the neighbor cell, and the absence may indicate that WTRU 310 is not required to read it.

If the WTRU 310 is required to read the SI of the CSG neighbor cell, the WTRU 310 may start the process and once it finishes reading the SI, it may inform the network through a measurement report or any other RRC message that the SI has been acquired. The network may take appropriate actions such as forwarding the data to the neighbor cell.

Figure 12:
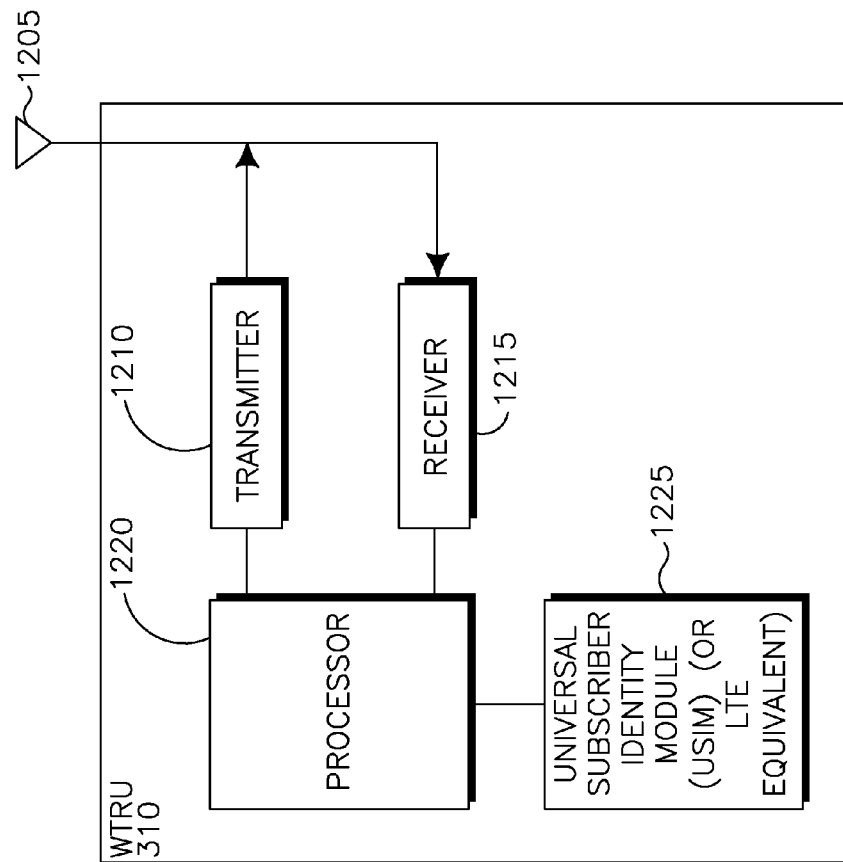
FIG. 12 shows an example of a block diagram of a WTRU that receives cell broadcasts and reads neighbor CSG cells.

FIG. 12 is an example of a block diagram of a WTRU 310 that is configured to receive cell broadcasts and read neighbor CSG cells 1200. The WTRU 310 includes an antenna 1205, a transmitter 1210, a receiver 1215, a processor 1220 and a universal subscriber identity module (USIM) (or LTE equivalent) 1225. The receiver 1215 is configured to receive a broadcast via the antenna 1205 from a cell including a cell ID. The processor 1220 is electrically coupled to the transmitter 1210, the receiver 1215 and the USIM (or LTE equivalent) 1225. The processor 1220 is configured to perform the above-described methods for inbound handover to a CSG cell.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, application specific integrated circuits (ASICs), application specific standard products (ASSPs), field programmable gate arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, mobility management entity (MME) or evolved packet core (EPC), or any host computer. The WTRU may be used in conjunction with modules, implemented in hardware and/or software including a software defined radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a near field communication (NFC) module, a liquid crystal display (LCD) display unit, an organic light-emitting diode (OLED) display unit, a digital music player, a media player, a video game player module, an Internet browser, and/or any wireless local area network (WLAN) or ultra wide band (UWB) module.

What is claimed is:
1. A method implemented in a network node, the method comprising:
receiving, from a wireless transmit/receive unit (WTRU), information indicating that a physical cell identity (PCI) of a neighbor closed subscriber group (CSG) cell corresponds to a predefined CSG cell range; and
transmitting, to the WTRU in response to receiving the information indicating that the PCI of the neighbor CSG cell corresponds to the predefined CSG cell range, an indication to report system information of the neighbor CSG cell.

2. The method as in claim 1, wherein, on a condition that the PCI does not correspond to the predefined CSG cell range, the neighbor CSG cell is in a closed cell range.

3. The method as in claim 2, further comprising:
on a condition that the neighbor CSG cell is in the closed cell range, receiving, from the WTRU, information indicating that the PCI is used with a high probability by a CSG cell that is in closed cell range.

4. The method as in claim 1, further comprising:
receiving the system information of the neighbor CSG cell; and
initiating a handover of the WTRU to the neighbor CSG cell in response to receiving the system information of the neighbor CSG cell.

5. The method as in claim 1, wherein the indication to report the system information of the neighbor CSG cell is an indication to report a cell global identity (CGI) of the neighbor CSG cell.

6. The method as in claim 1, wherein the predefined CSG cell range is a range of PCIs.

7. The method as in claim 6, wherein the range of PCIs corresponds to PCIs for hybrid cells and open cells.

8. The method as in claim 1, wherein the indication to report the system information of the neighbor CSG cell includes an indication to read the system information from the neighbor CSG cell.

9. The method as in claim 1, wherein the neighbor CSG cell is a cell detected by the WTRU.

10. The method as in claim 1, further comprising:
receiving the system information of the neighbor CSG cell from the WTRU in response to transmitting the indication to report the system information of the neighbor CSG cell.

11. A network node comprising:
a receiver configured to receive, from a wireless transmit/receive unit (WTRU), information indicating that a physical cell identity (PCI) of a neighbor closed subscriber group (CSG) cell corresponds to a predefined CSG cell range; and
a transmitter configured to transmit, to the WTRU in response to receiving the information indicating that the PCI of the neighbor CSG cell corresponds to the predefined CSG cell range, an indication to report system information of the neighbor CSG cell.

12. The network node as in claim 11, wherein, on a condition that the PCI does not correspond to the predefined CSG cell range, the neighbor CSG cell is in a closed cell range.

13. The network node as in claim 12, wherein the receiver is further configured to, on a condition that the neighbor CSG cell is in the closed cell range, receive, from the WTRU, information indicating that the PCI is used with a high probability by a CSG cell that is in closed cell range.

14. The network node as in claim 11, further comprising:
at least one processor electrically coupled to the receiver and the transmitter,
wherein the receiver is configured to receive the system information of the neighbor CSG cell, and the at least one processor is configured to initiate a handover of the WTRU to the neighbor CSG cell in response to receiving the system information of the neighbor CSG cell.

15. The network node as in claim 11, wherein the indication to report the system information of the neighbor CSG cell is an indication to report a cell global identity (CGI) of the neighbor CSG cell.

16. The network node as in claim 11, wherein the predefined CSG cell range is a range of PCIs.

17. The network node as in claim 16, wherein the range of PCIs corresponds to PCIs for hybrid cells and open cells.

18. The network node as in claim 11, wherein the indication to report the system information of the neighbor CSG cell includes an indication to read the system information from the neighbor CSG cell.

19. The network node as in claim 11, wherein the neighbor CSG cell is a cell detected by the WTRU.

20. The network node as in claim 11, wherein the receiver is configured to receive the system information of the neighbor CSG cell from the WTRU in response to transmitting the indication to report the system information of the neighbor CSG cell.

21. The network node as in claim 11, wherein the network node is an evolved Node-B.

22. The network node as in claim 11, wherein the network node is a Home evolved Node-B.

* * * * *